(12) United States Patent
Myrah et al.

(10) Patent No.: US 9,037,772 B2
(45) Date of Patent: May 19, 2015

(54) HOST BASED ZONE CONFIGURATION

(75) Inventors: Michael G Myrah, Cypress, TX (US);
Balaji Natrajan, Spring, TX (US);
Pruthviraj Herur Puttaiah, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 423 days.

(21) Appl. No.: 13/344,139

(22) Filed: Jan. 5, 2012

(65) Prior Publication Data

US 2013/0179617 A1    Jul. 11, 2013

(51) Int. Cl.
*G06F 13/00*     (2006.01)
*G06F 3/06*      (2006.01)

(52) U.S. Cl.
CPC ............ *G06F 3/0605* (2013.01); *G06F 3/0637* (2013.01); *G06F 3/0689* (2013.01)

(58) Field of Classification Search
CPC .... G06F 3/0605; G06F 3/0637; G06F 3/0689
USPC ....................................................... 710/316
See application file for complete search history.

(56) References Cited

U.S. PATENT DOCUMENTS

| | | | |
|---|---|---|---|
| 6,977,927 B1 * | 12/2005 | Bates et al. | 370/381 |
| 7,668,925 B1 | 2/2010 | Liao et al. | |
| 7,890,617 B2 * | 2/2011 | Odenwald et al. | 709/223 |
| 7,991,809 B2 | 8/2011 | Yellapragada | |
| 7,996,509 B2 | 8/2011 | Basham et al. | |
| 2004/0054758 A1 * | 3/2004 | Chang et al. | 709/219 |
| 2005/0091353 A1 | 4/2005 | Gopisetty et al. | |
| 2007/0220124 A1 * | 9/2007 | Golasky | 709/223 |
| 2009/0028339 A1 * | 1/2009 | Goodman et al. | 380/278 |
| 2009/0083484 A1 | 3/2009 | Basham et al. | |
| 2009/0222733 A1 * | 9/2009 | Basham et al. | 715/736 |
| 2011/0252354 A1 * | 10/2011 | Mimatsu | 715/771 |
| 2011/0320654 A1 * | 12/2011 | Butler et al. | 710/74 |
| 2012/0166724 A1 * | 6/2012 | Smith | 711/114 |
| 2012/0254553 A1 * | 10/2012 | Myrah et al. | 711/154 |
| 2012/0278551 A1 * | 11/2012 | Chakhaiyar et al. | 711/114 |

* cited by examiner

*Primary Examiner* — Nimesh G Patel
(74) *Attorney, Agent, or Firm* — Hewlett-Packard Patent Department

(57) ABSTRACT

A zone manager to provide a host with a list of storage drives that are not zoned to the host. The zone manager, in response to receipt of a command from the host to perform zone storage configuration for the host, to zone to host storage drives that were selected by the host from the list of storage drives.

22 Claims, 3 Drawing Sheets

HOST BASED ZONE CONFIGURATION

BACKGROUND

Direct-attached storage (DAS) refers to a data storage system that is directly attached to a host or server. The data capacity and connectivity of the DAS system may be improved through the use of switches or expanders, which can enable a large bank of DAS devices to be coupled to multiple hosts or servers. A communications protocol for enabling communications between the hosts and the storage system is the serial attached small computer system interface (SAS) protocol. SAS devices such as storage controllers, storage drives, switches and expanders can communicate with each other using the SAS protocol. The interconnection network between the SAS devices can be referred to as a fabric. The storage resources of the fabric may be made accessible to hosts or servers by configuring zone groups, which control how the switches or expanders route connections through the switches or expanders to couple specific hosts or servers to specific storage drives of storage resources.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

As explained above, a serial attached small computer system interface (SAS) system may include devices such as hosts, switches, expanders, and storage systems capable of communicating with each other using the SAS protocol. The interconnection network between the SAS devices may be referred to as a SAS fabric. The storage resources may be accessible to hosts by configuring zone groups, which can control how the expanders route connections through the switch to couple specific hosts to specific storage drives of a storage system. In one example, the present application describes a technique that may allow a user to accomplish these steps from the host which may help reduce storage configuration time and make future maintenance easier. In one example, described is a technique to provide a host with the capability to allow a user to select storage drives that are not zoned to the host and to implicitly configure the necessary zone groups for the host.

In one example, disclosed is a switch that includes an expander and a zone manager. The expander can couple a host to a storage system that supports storage drives. The expander can be coupled to a zone manager which can provide the host with a list of storage drives that are not zoned to the host. The switch, host and storage system can communicate with each over a fabric that employs the SAS protocol. The zone manager can, in response to receipt of a command from the host to perform zone storage configuration for the host, perform zone storage configuration which includes a process to zone to the host storage drives that were selected by the host from the list of storage drives. In one example, the host can include a user interface to allow a user to communicate with the switch and to cause the switch to zone storage drives that were selected by the host. The techniques of the present application may provide advantages. For example, having the host provide a user interface to configure storage may reduce the complexity a user may encounter when having to configure storage systems. The disclosed host based zone configuration technique can help facilitate quick datacenter deployment which can help reduce the time to configure storage and make future maintenance easier once the system is configured.

Figure 1:
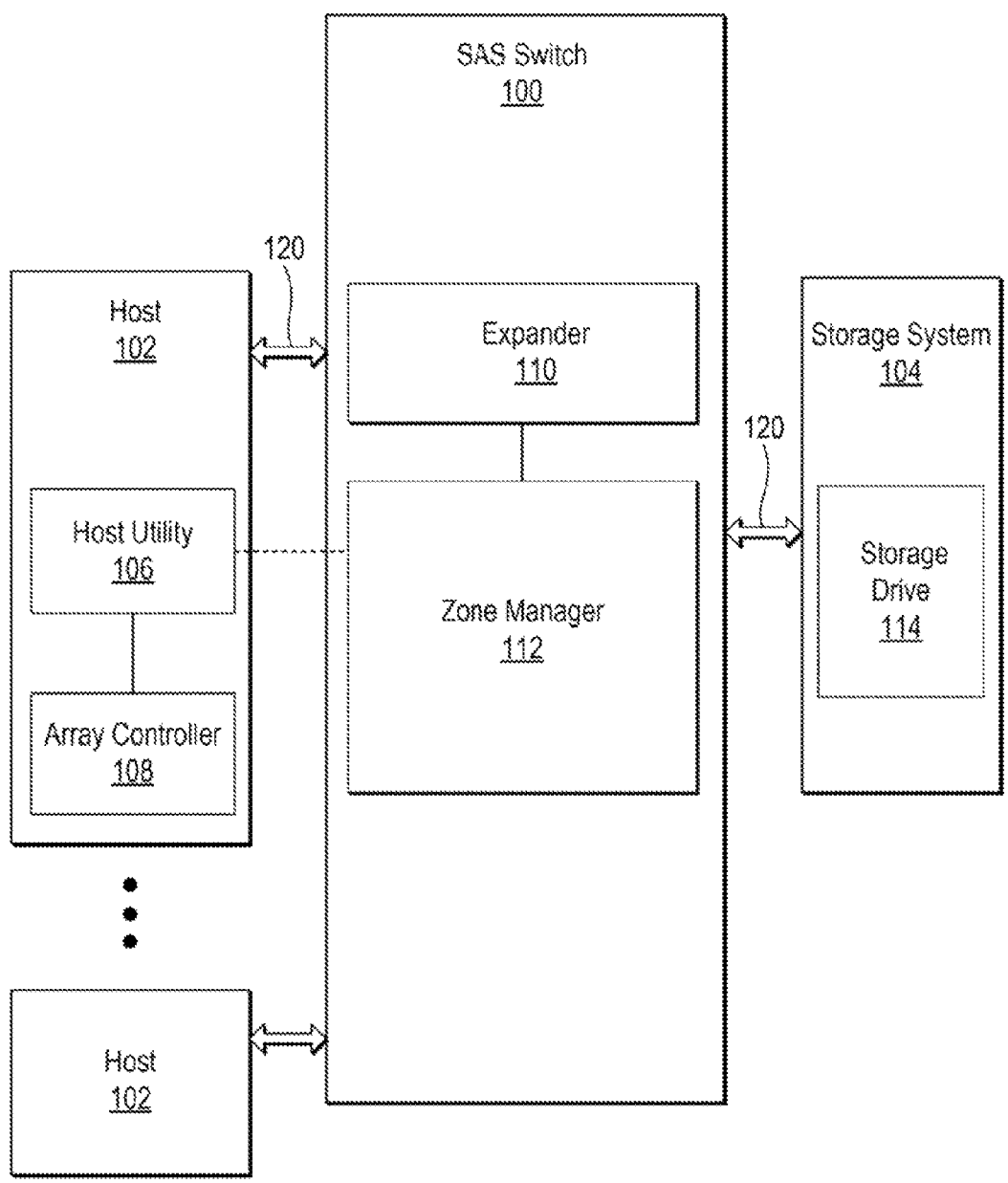
FIG. 1 is a block diagram of a system to provide host based zone configuration in accordance with embodiments.

FIG. 1 is a block diagram of a system to provide host based zone configuration in accordance with embodiments. The system includes hosts 102, a switch 100 and a storage system 104 configured to communicate with each other over communication path 120 using the SAS protocol, for example. The hosts 102 can be operatively coupled to storage system 104 which include storage drives 114, such as disk drives, solid state drives, and the like. The hosts 102 include a host utility 106 to communicate with an array controller 108 to enable the hosts to access and communicate with switch 100 and storage system 104. In one example, storage system 104 can include storage drive bays which can support storage drives 114 and that can be disposed in the storage drive bays. The switch 100 includes an expander 110 to couple hosts 102 to storage system 104. The expander 110 is coupled to a zone manager 112 which can provide the host with information about storage resources related to storage system 104. For example, zone manager 112 can provide hosts 102 with a list of storage drives that are not zoned to the hosts. The zone manager 112 can, in response to receipt of commands from hosts 102 to perform zone storage configuration for the hosts, perform zone storage configuration functions such as zoning to the hosts storage drives that were selected by the host from the list of storage drives, as described in further detail below.

The hosts 102, switch 100 and storage system 104 may use the SAS protocol for communication between the devices including connecting and transferring data between these devices. In another example, the system can employ Serial SCSI Protocol (SSP) protocol, SAS-2 protocol or any other communication protocol to allow for the exchange of data between devices. In a SAS protocol, hosts 102 and associated components including host utility 106 and array controllers 108 can be configured as initiators or initiator devices. An Initiator may be referred to as a device that can originate requests to be processed by a target device and receive responses for the same requests from other target devices. In a SAS protocol, switch 100 and associated components including expander 110 and zone manager 112 can be configured as an expander or expander device. An expander may be referred to as device that can facilitate communication between SAS devices. In a SAS protocol, storage system 104 and associated components including storage drives 114 can be configured as targets or target devices. A target may be referred to as a device containing logical units and target ports that can receive requests for processing and send responses for the same requests to initiator devices.

In some examples, hosts 102, switch 100 and storage system 104 can installed in a blade enclosure. For example, hosts 102 can be blade servers and the blade enclosure may include one or more blade bays for receiving hosts 102, array controllers 108 and an interconnect bay for receiving switch 100. In another example, storage system 104 can comprise storage drive bays for supporting storage drives 114 and the storage drive bays may be included in a separate storage enclosure.

The host 102 can be any data processing device such as a server computer, workstation and the like. The host utility 106 can be any means that can facilitate communication between a user and the system components including array controller 108. For example, host can be a program or application having software instructions executable by a processor that facilitate communication between a user and the system components including array controller 108. The host utility 106 can include an interface means such as a user interface, command line interface (CLI), graphical user interface (GUI) or other means for allowing a user to exchange information with array controller 108 and the rest of the system. The array controller 108 can comprise storage controllers such as disk array controllers which can manage storage or physical disk drives and can present them to the host as logical units. In some examples, array controller 108 can implement redundant array of independent disks (RAID) functionality and may be referred to as a RAID controller.

The expander 110 can be configured to control the routing between hosts 102 and storage system 104. The expander 110 may be coupled to one or more hosts 102 and storage system 104 through communication path 120. The communication path 120 may comprise cables or hardwired interconnections included in a storage or blade enclosure, for example. The two ends of communication path 120 may be physical interconnections and may be referred to herein as a port. The expander 110 may include a plurality of ports referred to herein as expander ports. Expander ports may be coupled to host ports and storage system ports through communication path 120.

The zone manager 112 can perform zone configuration functions for hosts 102. The functionality of zone configuration can include storage configuration of array controller 108 such as configuration of storage drives 114 associated with storage system 104. The zone manager 112 can define zone groups and assign zone groups to a specified host 102 and array controller 108. As used herein, the term zone group may refer to a set of one or more storage drives 114 that can be assigned to storage system 104 or storage drive bays that can then be assigned to host 102. Zone groups can be assigned to hosts 102 through zone manager 112 according to a zoning configuration specified by the user through host utility 106.

To illustrate operation, in one example, zone manager 112 can check whether it has received from host 102 a request for a list of storage drives that are not zoned to the host. A user with access to host 102 can employ a user interface associated with host utility 106 to communicate with array controller 108. The user can employ the user interface to send to array controller 108 a request for a list of storage drives that are not zoned as well storage drives that are zoned to the host. The array controller 108 can respond by generating a SSP REPORT DRIVES command directed to switch 100. The REPORT DRIVES command can include a request to have switch 100 provide host 102 with a list of storage drives that are not zoned to the host as well as a list of storage drives that are zoned to the host.

Continuing with a description of the operation of the system, zone manger 112 can respond to the command from host 102 by providing the host with a list of storage drives that are not zoned to the host as well as a list of storage drives that are zoned to the host. In this manner, host 102 can retrieve this list from switch 100 instead of having to perform SAS standard discovery functionality because the storage drives may not be zoned to the host by default. In another example, zone manager 112 can respond to the host with a list of storage drives that are zoned to other hosts coupled to the system or fabric. In one example, by default, for security reasons, switch 100 can return to host 102 a list of storage drives that are currently zoned to the host that is requesting this data in addition to a list of storage drives that are not zoned to the host. If host 102 can provide authentication data for an administrator level user, then switch 100 can respond to the host and provide additional meta-data for storage drives that are zoned to other hosts on the fabric.

The host can process the response from switch 100 which may include a list of storage drives that are not zoned to the host. In one example, array controller 108 can receive the response and then forward the response to host utility 106. The host utility 106 can present the list of storage drives to the user through a user interface of the host utility. The user interface can allow a user to select one or more storage drives from the list of storage drives that are not zoned to host 102. The user interface can display information about storage drives that are not available to host 102 and prevent the user from selecting those drives. The user interface can display further information about the storage drives such as ownership of the drives or which storage drives are zoned to which hosts. The user interface can allow the user to specify particular storage drives to select to form a logical drive and submit a request for the formation of such logical drive. The user interface can allow a user to request particular storage drives to be zoned by sending this information in the form of a zone configuration request to array controller 108. The array controller 108 can then process this request and respond by generating and sending a zone configuration request in the form of a SSP GRANT ACCESS command to switch 100.

The zone manager 112 can check whether it has received from host 102 a command to perform zone configuration. In one example, array controller 108 can send a zone configuration request in the form of a SSP GRANT ACCESS command to switch 100. The zone manger 112 can respond by performing zone configuration of storage drives that were selected by the host from the list of storage drives. The zone manager 112 can check whether the selected storage drives are zoned to host 102. For example, if zone manager 112 determines that no storage drives are assigned to zone groups and assigned to array controller 108, then the zone manager can assign the selected storage drives to a zone group and assign the zone group to array controller 108. In one example, storage system 104 can comprise a drive bay with storage drives and, in this case, the zone group can comprise the drive bay associated with the specified storage drives. In another example, if zone manager 112 determines that there are storage drives assigned to an existing zone group and assigned to array controller 108, then the zone manager can assign the selected storage drives to the existing zone group. The zone manager 112 can check whether the zone configuration was successful. If zone configuration was successful, then zone manager 112 can send to host 102 a response indicating whether zone configuration was successful. The response sent to host 102 can be received by array controller 108 which can then forward the response to host utility 106. The host utility 106 can display this information to the user interface associated the host utility to allow the user to view this information and take further action as necessary. For example, if the zone configuration was successful, then host 102 can perform further storage functions such as forming a volume based on the zoned storage drives. In another example, if the zone configuration was not successful, then host 102 can display to the user information describing why the zone configuration was not successful.

The above operation described the ability of host 102 to send to switch 100 a command to cause the switch to perform zone configuration by zoning storage devices to the host. In another example, host 102 can send to switch 100 a command to cause the switch to release storage drives that were previously zoned to the host for subsequent use by another host. The host 102 can cause array controller 108 to generate a SSP REMOVE ACCESS command which can be sent to switch 100. The zone manager 112 can receive this command and release (unzone) the specified storage drives from host 102 to make them available to other hosts.

The above process was described in the context of zoning storage drives 114 associated with storage system 104. In other example, the above process may be applicable to zoning storage drives 114 associated with drive bays. In one example, host utility 106 can instruct array controller 108 to generate a command directed to switch 100 to have the switch allocate and de-allocate storage resources or other SAS fabric resources from the switch. The switch 100 can expose zone manager 112 to host 102 by making the host a SSP target device to allow command requests to be sent from array controller 108 over communication path 120 using the SAS protocol. In this manner, communication can take place over the same communication path as other communication, that is, in band communication. The zone manager 112 can send to host 102 a SCSI REPORT UNZONED DRIVE BAYS command to report storage drives that are being managed by the zone manager and that are not zoned to other hosts. The zone manager 112 can also employ a SCSI REPORT ZONED DRIVE BAYS command which can be used to have the zone manger retrieve information about drive bays currently zoned to other hosts and report this information to the host. The list of storage drives that zone manager 112 provides host 102 may be empty based on a security policy for incoming requests that a user or storage administrator can specify using, for example, a switch management interface associated with switch 100.

To request storage drives associated with drive bays to zone to host 102, host array controller 108 can send to zone manager 112 a GRANT DRIVE BAY ACCESS command containing a list of drive bays to be zoned to the array controller. If zone manager 112 can satisfy the request, the zone manager can zone the drive bays to the requesting host and report that the zone configuration was successful. On the other hand, if one or more drive bays cannot be allocated to host 102 requesting the storage drives, then zone manager 112 can respond with CHECK CONDITION response containing specific SCSI response data indicating the reason for failure.

The host 102 can have switch 100 release previously zoned storage drives or other storage resources by issuing and sending a RELEASE DRIVE BAY command to zone manager 112. This can cause zone manager 112 to release (unzone or zone out) the requested drive bays and place them in an unallocated pool of drive bays for possible allocation to other hosts.

The system of FIG. 1 is an example of a system of providing host based zone configuration but it should be understood that other examples are possible to implement the techniques of the present application. For example, two hosts 102 are shown but it should be understood that a different number of hosts can be employed to implement the technique of the present application. Although a single switch 100 and storage system 104 are shown, it shown be understood that a plurality of switches and storage systems can be employed to implement the techniques of the present application. The functionality of host utility 106 and array controller 108 are shown as part of host 102, however, it should be understood that other configurations are possible. To illustrate, in one example, the functionality of host utility 106 can be combined with that of array controller 108. In another example, the functionality of host utility 106 and array controller 108 can be distributed among a plurality of devices located locally, remotely or a combination thereof. The functionality of host 102 and switch 100 and its components can be implemented in hardware such as in a application specific integrated circuit (ASIC), software, or a combination thereof. The techniques of the present application are shown as part of a SAS fabric architecture, however, it should be understood that the techniques of the present application can be applicable in other architectures such as Storage Area Networks (SAN), Direct Attached Networks (DAN) or other network architectures.

Figure 2:
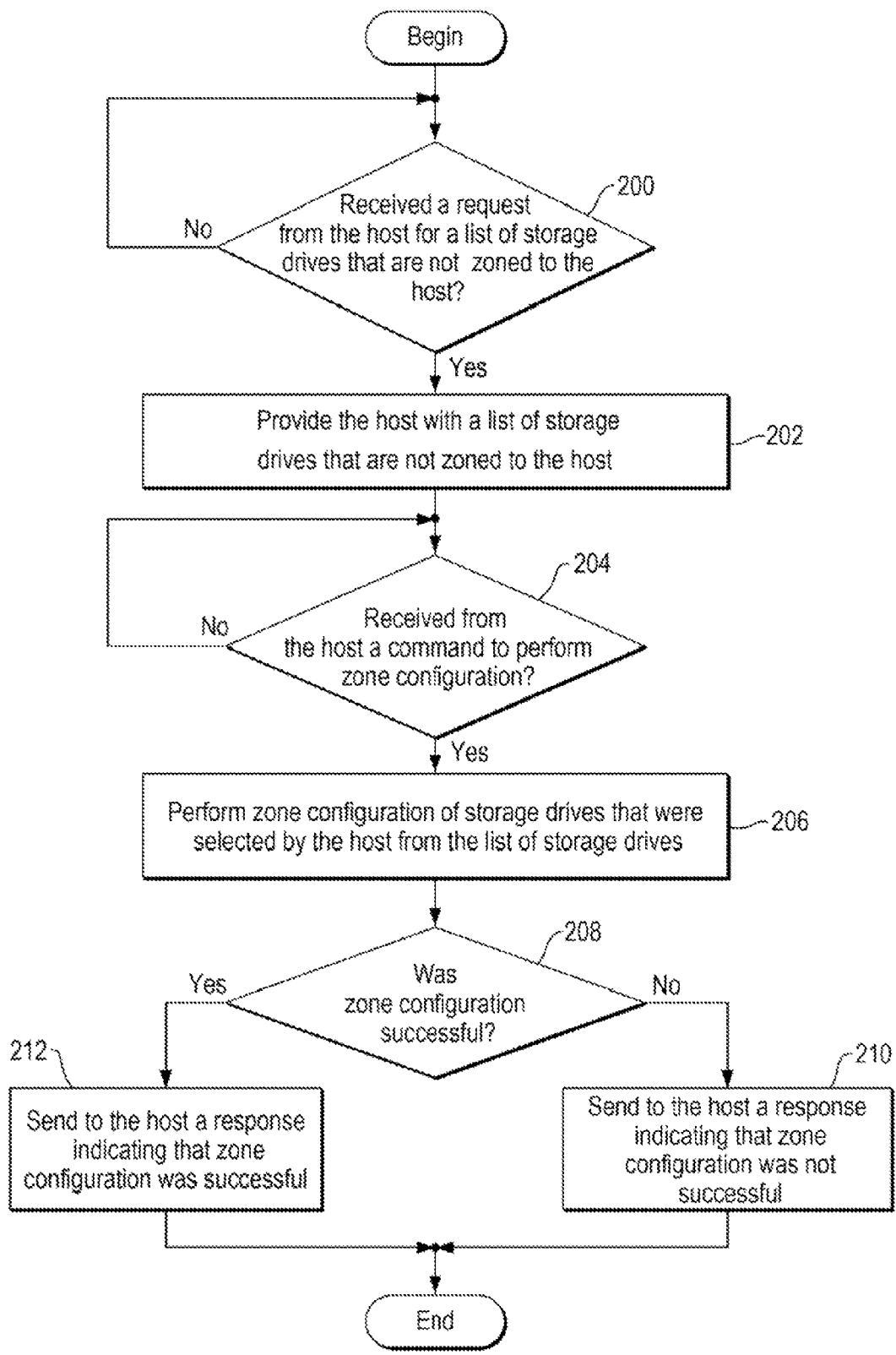
FIG. 2 is a process flow diagram of a method of providing host based zone configuration in accordance with embodiments.

FIG. 2 is a process flow diagram of a method of providing host based zone configuration in accordance with embodiments. The method may be performed by the system shown in FIG. 1. To illustrate, in one example, it can be assumed that a user of host 102 is interested in having particular storage drives 114 zoned to the host. Further, the user can employ a user interface associated with host utility 106 to communicate with array controller 108 and switch 100 to perform zone configuration of storage drives including zoning particular storage drives to the host.

The method may begin at block 200, wherein zone manager 112 can check whether it has received from host 102 a request for a list of storage drives that are not zoned to the host. For example, if host 102 sends a command to zone manager 112 requesting a list of storage drives are not zoned to the host then processing can proceed to block 202 as described below. On the other hand, if host 102 does not send to zone manager 112 a command requesting for a list of storage drives not zoned to the host, then processing proceeds back to block 200 where zone manager 112 will continue to check for receipt for such command.

To illustrate, in one example, it can be assumed that host 102 sends a command to zone manager 112 requesting a list of storage drives that are not zoned to the host. In this case, a user with access to host 102 can employ a user interface associated with host utility 106 to communicate with array controller 108. The user can employ the user interface to send to array controller 108 a request for a list of storage drives are not zoned to the host. The array controller 108 can respond and then generate a SSP REPORT DRIVES command directed to switch 100. The REPORT DRIVES command can include a request to have switch 100 provide host 102 with a list of storage drives that are not zoned to the host. In another example, the REPORT DRIVES command can include a request to have switch 100 provide host 102 with a list of storage drives that are zoned to the host. Assuming that host 102 sent the command to zone manager 112, then processing can proceed to block 202 as described below in further detail.

At block 202, zone manger 112 can respond to the command from host 102 by providing the host with a list of storage drives that are not zoned to the host. For example, if host 102 sent to switch 100 a SSP REPORT DRIVES command, then zone manager 112 can respond to the host with a list of storage drives that are not zoned to the host. In another example, zone manager 112 can respond to the host with a list of storage drives that are zoned to the host. In another example, zone manager 112 can respond to the host with a list of storage drives that are zoned to other hosts coupled to the system or fabric. In one example, by default, for security reasons, switch 100 can return to host 102 a list of storage drives that are currently zoned to the host that is requesting this data in addition to a list of storage drives that are not zoned to the host. If host 102 can provide authentication data for an administrator level user, then switch 100 can provide additional meta-data for storage drives that are zoned to other hosts on the fabric. Once zone manager 112 responds to host 102 with the list, then processing can proceed to block 204 as described below.

From the perspective of host 102, the host can process the response from switch 100 which may include a list of storage drives that are not zoned to the host. In one example, array controller 108 can receive the response and then forward the response to host utility 106. The host utility 106 can present the list of storage drives to the user through a user interface of the host utility. The user interface can allow a user to select one or more storage drives from the list of storage drives that are not zoned to host 102. The user interface can display information about storage drives that are not available to host 102 and prevent the user from selecting those drives. The user interface can display information about the storage drives such as ownership of the drives or which storage drives are zoned to which hosts. For example, the user interface can allow the user to specify particular storage drives to form a logical drive and submit a request for the formation of such logical drive. The user interface can allow a user to request particular storage drives to be zoned by sending this information in the form of a zone configuration request to array controller 108. The array controller 108 can then process this request and send a zone configuration request in the form of a SSP GRANT ACCESS command to switch 100, as explained below at block 204.

At block 204, zone manager 112 checks whether it has received from host 102 a command to perform zone configuration of storage drives that were selected by the host from the list of storage drives. For example, if host 102 sends a command to zone manager 112 to perform zone configuration then processing can proceed to block 206 as described below. In one example, array controller 108 can send a zone configuration request in the form of a SSP GRANT ACCESS command to switch 100. On the other hand, if host 102 does not send a zone configuration command, then processing can proceed back to block 204 where zone manager 112 can continue to check for receipt from host 102 for such a command.

At block 206, zone manger 112 can perform zone configuration of storage drives that were selected by the host from the list of storage drives. The zone manager 112 can attempt to perform zone configuration by checking whether the selected storage drives are zoned to host 102. For example, if zone manager 112 determines that zoning is possible, that is, that no storage drives are assigned to zone groups and assigned to array controller 108, then the zone manager can assign the selected storage drives to a zone group and assign the zone group to array controller 108. In one example, storage system 104 can comprise a drive bay with storage drives and, in this case, the zone group can include the drive bay associated with the specified storage drives. In another example, if zone manager 112 determines that there are storage drives assigned to an existing zone group and assigned to array controller 108, then the zone manager can assign the selected storage drives to the existing zone group.

At block 208, zone manager 112 can check whether the zone configuration performed at block 206 was successful. If zone configuration was successful, then processing proceeds to block 212 where zone manager 112 sends to host 102 a response indicating that zone configuration was successful. On the other hand, if zone configuration was not successful, then processing proceeds to block 210 where zone manager 112 sends to host 102 a response indicating that zone configuration was not successful. In either case, the response sent to host 102 can be received by array controller 108 which can then forward the response to host utility 106. The host utility 106 can display this information to the user interface associated with the host utility to allow the user to view this information and take further action as necessary. For example, if the zone configuration was successful, then host 102 can perform further storage functions such as forming a volume based on the zoned storage drives. In another example, if the zone configuration was not successful, then host 102 can display to the user information describing why the zone configuration was not successful.

As explained above, in one example, described is a technique that provides a user with the ability to configure storage from host 102 by using a host utility 106 associated with array controller 108 to implicitly create the zone groups. These techniques can provide for seamless and unified host based fabric storage resource allocation and de-allocation configuration.

Figure 3:
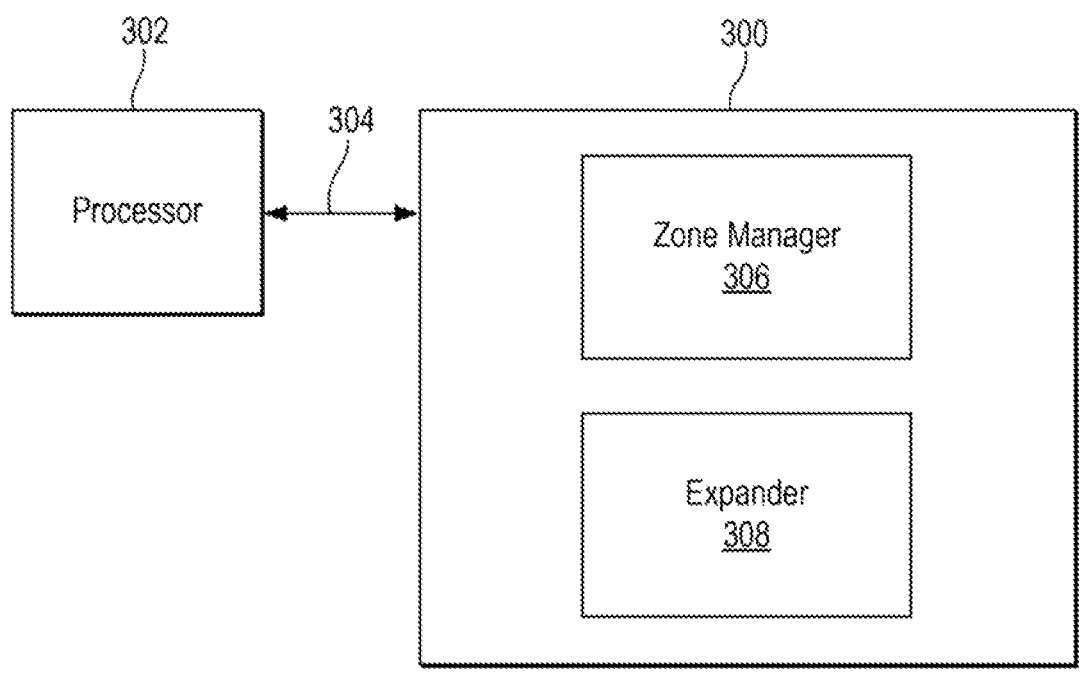
FIG. 3 is a block diagram showing a non-transitory, computer-readable medium that stores instructions for providing host based zone configuration in accordance with embodiments.

FIG. 3 is a block diagram showing a non-transitory, computer-readable medium that stores code for providing host based zone configuration in accordance with embodiments. The non-transitory, computer-readable medium is generally referred to by the reference number 300 and may be included in switch of system 100 described in relation to FIG. 1. The non-transitory, computer-readable medium 300 may correspond to any typical storage device that stores computer-implemented instructions, such as programming code or the like. For example, the non-transitory, computer-readable medium 300 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 302 generally retrieves and executes the instructions stored in the non-transitory, computer-readable medium 300 to provide host based zone configuration in accordance with embodiments. In an embodiment, the tangible, machine-readable medium 300 can be accessed by the processor 302 over a bus 304. A first region 306 of the non-transitory, computer-readable medium 300 may include zone manager functionality as described herein. A second region 308 of the non-transitory, computer-readable medium 300 may include expander functionality as described herein. Although not shown, further regions of the non-transitory, computer-readable medium 300 may include host and host utility functionality as described herein Although shown as contiguous blocks, the software components can be stored in any order or configuration. For example, if the non-transitory, computer-readable medium 300 is a hard drive, the software components can be stored in non-contiguous, or even overlapping, sectors.

What is claimed is:

1. A switch comprising:
   an expander to couple a host to a storage system that supports storage drives; and
   a zone manager coupled to the expander to provide the host with a list of storage drives that are not zoned to the host, wherein the list excludes storage drives already zoned to the host, and in response to receipt of a command from the host to perform zone storage configuration for the host, perform zone storage configuration, which includes zoning to the host, storage drives that were selected by the host from the list of storage drives.

2. The switch of claim 1, wherein the zone manager is configured to provide the host with the list of storage drives in response to receipt of a command from the host.

3. The switch of claim 1, wherein the zone manager is configured to provide the host with a list of storage drives that is zoned to the host.

4. The switch of claim 1, wherein the zone manager is configured to release a storage drive that was previously zoned to the host and to allow the released storage drive to be zoned by another host, in response to receipt of a command from the host.

5. The switch of claim 1, wherein the zone manager is configured to send to the host a response indicating whether the zone storage configuration was successful.

6. The switch of claim 1, wherein the zone manager is configured to provide the host with a list of storage drives that is zoned to another host.

7. The switch of claim 1, wherein the zone storage configuration includes zoning the selected storage drives to an existing zone group or to a new zone group.

8. The switch of claim 1, wherein the zone manager is configured to provide the host with the list of storage drives managed by the zone manager that are not zoned to other hosts.

9. The switch of claim 1, further comprising a user interface configured to display information about storage drives that are not available to the host and prevent selection of the storage drives that are not available.

10. A method of using a zone manager to perform zone storage configuration and using an expander to couple a host to a storage system that supports storage drives, the method comprising:
the zone manager providing the host with a list of storage drives that are not zoned to the host, wherein the list excludes storage drives already zoned to the host; and
in response to the zone manager receiving a command from the host to perform zone storage configuration, performing zone storage configuration, which includes zoning to the host, storage drives that were selected by the host from the list of storage drives.

11. The method of claim 10, wherein the zone manager providing the host with the list of storage drives is in response to receipt of a command from the host.

12. The method of claim 10, further comprising the zone manager providing the host with a list of storage drives that is zoned to the host.

13. The method of claim 10, further comprising the zone manager releasing a storage drive that was previously zoned to the host and to allow the released storage drive to be zoned another host, in response to receipt of a command from the host.

14. The method of claim 10, further comprising the zone manager sending to the host a response indicating whether the zone storage configuration was successful.

15. The method of claim 10, further comprising the zone manager providing the host with a list of storage drives that is zoned to another host.

16. The method of claim 10, wherein the zone storage configuration includes zoning storage drives to an existing zone group or to a new zone group.

17. A non-transitory computer-readable medium having computer executable instructions stored thereon to use a zone manager to perform zone storage configuration and use an expander to couple a host to a storage system that supports storage drives, the instructions are executable by a processor to:
provide the host with a list of storage drives that are not zoned to the host, wherein the list excludes storage drives already zoned to the host; and
in response to the zone manager receiving a command from the host to perform zone storage configuration, zone to the host, storage drives that were selected by the host from the list of storage drives.

18. The computer readable medium of claim 17 further comprising instructions that if executed cause a processor to:
provide the host with the list of storage drives is in response to receipt of a command from the host.

19. The computer readable medium of claim 17 further comprising instructions that if executed cause a processor to:
provide the host with a list of storage drives that is zoned to the host.

20. The computer readable medium of claim 17 further comprising instructions that if executed cause a processor to:
release a storage drive that was previously zoned to the host and to allow the released storage drive to be zoned by another host, in response to receipt of a command from the host.

21. The computer readable medium of claim 17 further comprising instructions that if executed cause a processor to:
send to the host a response indicating whether the zone storage configuration was successful.

22. The computer readable medium of claim 17 further comprising instructions that if executed cause a processor to:
provide the host with a list of storage drives that is zoned to another host.

* * * * *